United States Patent
Wendlandt et al.

(10) Patent No.: US 10,713,747 B2
(45) Date of Patent: Jul. 14, 2020

(54) SYSTEM AND METHOD FOR DISTRIBUTED PROCESSING OF GRAPHIC SERVER COMPONENTS

(71) Applicant: HONEYWELL INTERNATIONAL INC., Morris Plains, NJ (US)

(72) Inventors: Richard Wendlandt, Glendale, AZ (US); Edward Colin Layden, Glendale, AZ (US); Scott Hammond, Glendale, AZ (US); Kannan Kathirvel, Erode (IN); Adam Folts, Prescott, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 53 days.

(21) Appl. No.: 16/003,363

(22) Filed: Jun. 8, 2018

(65) Prior Publication Data

US 2019/0378236 A1    Dec. 12, 2019

(51) Int. Cl.
*G06T 1/20* (2006.01)
*G09G 5/14* (2006.01)
*G09G 5/36* (2006.01)

(52) U.S. Cl.
CPC .............. *G06T 1/20* (2013.01); *G09G 5/14* (2013.01); *G09G 5/363* (2013.01); *G09G 2370/022* (2013.01); *G09G 2380/12* (2013.01)

(58) Field of Classification Search
CPC .............. G06T 1/20; G09G 2380/12; G09G 2370/022; G09G 5/14; G09G 5/363
See application file for complete search history.

(56) References Cited

U.S. PATENT DOCUMENTS

| | | | |
|---|---|---|---|
| 8,788,126 B1 | 7/2014 | Bull et al. | |
| 9,001,137 B2 | 4/2015 | Persson | |
| 9,060,010 B1 | 6/2015 | McCusker et al. | |
| 9,105,208 B2 | 8/2015 | Son et al. | |
| 9,195,375 B2 | 11/2015 | Deleris et al. | |
| 9,679,346 B2 | 6/2017 | Begeman et al. | |
| 2015/0221059 A1 | 8/2015 | Baker | |
| 2015/0286589 A1 | 10/2015 | Zante et al. | |

(Continued)

FOREIGN PATENT DOCUMENTS

| | | |
|---|---|---|
| WO | 2008082641 A2 | 7/2008 |
| WO | 2015103374 A1 | 7/2015 |

OTHER PUBLICATIONS

Lefebvre, Y.; Mastering the ARINC 661 Standard; PRESAGIS; Copyright 2011.

*Primary Examiner* — Nicholas R Wilson
(74) *Attorney, Agent, or Firm* — Lorenz & Kopf, LLP (57) ABSTRACT

A method in a multi-core processing system for generating graphical commands is provided. The method includes generating a unique layer task for each of a plurality of layers that forms the current display frame in a cockpit display system (CDS), wherein the CDS is configured to display a plurality of windows, each window includes a plurality of layers, each layer includes one or more widgets that belong to a single user application, and each layer task includes information for a processor core in the multi-core processing system to generate graphical commands that when executed cause the rendering of the graphics described by the layer. The method further includes executing a plurality of layer tasks in parallel by a plurality of the processor cores in the multi-core processing system to generate graphical commands for execution by a GPU to render another display frame in the CDS.

20 Claims, 7 Drawing Sheets

(56) References Cited

U.S. PATENT DOCUMENTS

| | | |
|---|---|---|
| 2015/0287157 A1 | 10/2015 | Zante et al. |
| 2016/0117152 A1 | 4/2016 | Baker |
| 2016/0328271 A1 | 11/2016 | Gibbs et al. |
| 2017/0344191 A1 | 11/2017 | Zandee et al. |

SYSTEM AND METHOD FOR DISTRIBUTED PROCESSING OF GRAPHIC SERVER COMPONENTS

TECHNICAL FIELD

The present disclosure generally relates to graphic servers, and more particularly relates to graphic servers that are implemented in a multi-core processor system.

BACKGROUND

Graphic servers such as ARINC 661 servers may be employed on aircraft to display graphics on cockpit displays. The graphic servers may be implemented using a separate general-purpose processing unit and a separate graphics processing unit.

To reduce cockpit display power, weight and cost, it is desirable to employ lower power and lower weight options. Various types of integrated circuits, such as some system-on-chips (SoC) can integrate a microprocessor (CPU) along with a graphical processing unit (GPU), memory blocks and other peripheral interfaces into a single silicon die. SoCs may provide a lower powered and lower weight option for implementing a graphics server, but may also provide lower performance compared with a design using a separate general-purpose processing unit and a separate graphics processing unit. Some integrated circuits (including SoCs), however, may include a multi-core processor as the general-purpose processing unit. Advantageous use of a plurality of the processor cores in parallel in the multi-core processor may prevent performance loss when implementing a graphics server.

Hence, it is desirable to provide systems and methods for providing a graphic server using a lower power and weight integrated circuit that uses a plurality of processor cores in parallel to reduce potential performance loss. Furthermore, other desirable features and characteristics will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method in a multi-core processing system for generating graphical commands is disclosed. The method includes generating, by a processor core, a unique layer task for each of a plurality of layers that forms the current display frame in a cockpit display system (CDS), wherein the CDS is configured to display a plurality of windows, each window includes a plurality of layers, each layer is configured to be displayed within a specific viewing area within a window, each layer includes one or more widgets that belong to a single user application, and wherein each layer task includes information for a processor core in the multi-core processing system to use to generate graphical commands that when executed by a graphical processing unit (GPU) cause the rendering of the graphics described by the layer. The method further includes executing a plurality of layer tasks in parallel by a plurality of the processor cores in the multi-core processing system to generate graphical commands for execution by the GPU to render another display frame in the CDS.

A multi-core processing system in an integrated circuit configured by programming instructions in non-transient computer readable media is disclosed. The multi-core processing system is configured to generate, by a processor core, a unique set of layer tasks for each of a plurality of layers that forms the current display frame in a cockpit display system (CDS), wherein the CDS is configured to display a plurality of windows, each window includes a plurality of layers, each layer is configured to be displayed within a specific viewing area within a window, each layer includes one or more widgets that belong to a single user application, and wherein the layer tasks for a layer include tasks for the processor cores in the multi-core processing system to perform to generate graphical commands that when executed by a graphical processing unit (GPU) cause the rendering of the widgets in the layer. The multi-core processing system is further configured to execute a plurality of the sets of layer tasks in parallel by a plurality of processor cores to generate graphical commands for execution by the GPU to render another display frame in the CDS.

A processor-implemented method in an aircraft for distributing the processing of graphical components to parallel processor cores in a multi-core processor is provided. The method includes: identifying layers to be displayed by a cockpit display system, wherein the cockpit display system is configured to display a plurality of windows, each window includes a plurality of layers, each layer is configured to be displayed within a specific viewing area within a window, and each layer includes one or more widgets that belong to a single user application. The method further includes extracting graphical preconditions for each layer by parsing the definition file for the layer and determining whether parameter values other than default parameter values specified in the definition file are being used for the layer; creating a layer task for each layer, wherein each layer task includes the necessary information to generate the graphics described by the layer, and the necessary information for each layer task includes a layer identifier, a layer task type, a layer task sequence number, an identifier for the window in the cockpit display system that owns the layer, and graphical settings under which the layer needs to get displayed. The method further includes scheduling each layer task to one of the plurality of processor cores in the multi-core processor, wherein the layer tasks are scheduled one at a time to an available processor core; generating, using the processor cores, graphical commands for each layer task per the state of the widgets in the layer associated with the layer task and the widget graphical definitions; storing the generated graphical commands for a layer task in one or more unique graphical command buffers for the layer task; re-ordering the graphical commands in proper visual order by re-ordering the unique graphical command buffers; and submitting the re-ordered graphical commands to a graphics processor for rendering on the cockpit display system.

A multi-core processing system is provided. The multi-core processing system is configured to: identify a plurality of graphical window segments in a graphical window; generate, by a processor core, a unique set of segment tasks for each of the plurality of graphical window segments that forms a current display frame for the graphical window, wherein the segment tasks for a graphical window segment comprise tasks for the processor cores in the multi-core processing system to perform to generate graphical commands that when executed by a graphical processing unit (GPU) cause the rendering of the graphical elements in the graphical window segment; and execute a plurality of the sets of segment tasks in parallel by a plurality of processor cores to generate graphical commands for execution by the GPU to render another display frame.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Aspects of the present disclosure are best understood from the following detailed description when read with the accompanying figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps or operations. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Described herein are systems, methods, apparatus, and techniques for generating graphical commands in a cockpit display system using a multi-core processor. Using an integrated circuit (IC) that includes a multi-core processor to implement a graphics server may result in a reduced overall processing time for the graphics server and may result in a graphics server that consumes less power.

An aircraft cockpit may include a plurality of display devices (e.g., multi-function displays (MFDs), primary flight displays (PFDs), Synoptics, engine-indicating and crew-alerting system (EICAS), etc.) for displaying content generated by user applications (UAs) and for retrieving selections or entries from the flight crew made via a display device to pass on to one or more UAs. The aircraft may use a cockpit display system (CDS), such as one specified in ARINC 661, to provide a standard way for UAs to communicate with the display devices. The CDS may use widgets to display on display devices content generated and requested to be displayed by UAs. The CDS may also use widgets displayed on display devices for receiving selections or data entries from the flight crew. The CDS may provide a CDS server for interfacing with the UAs and the display devices.

Figure 1:
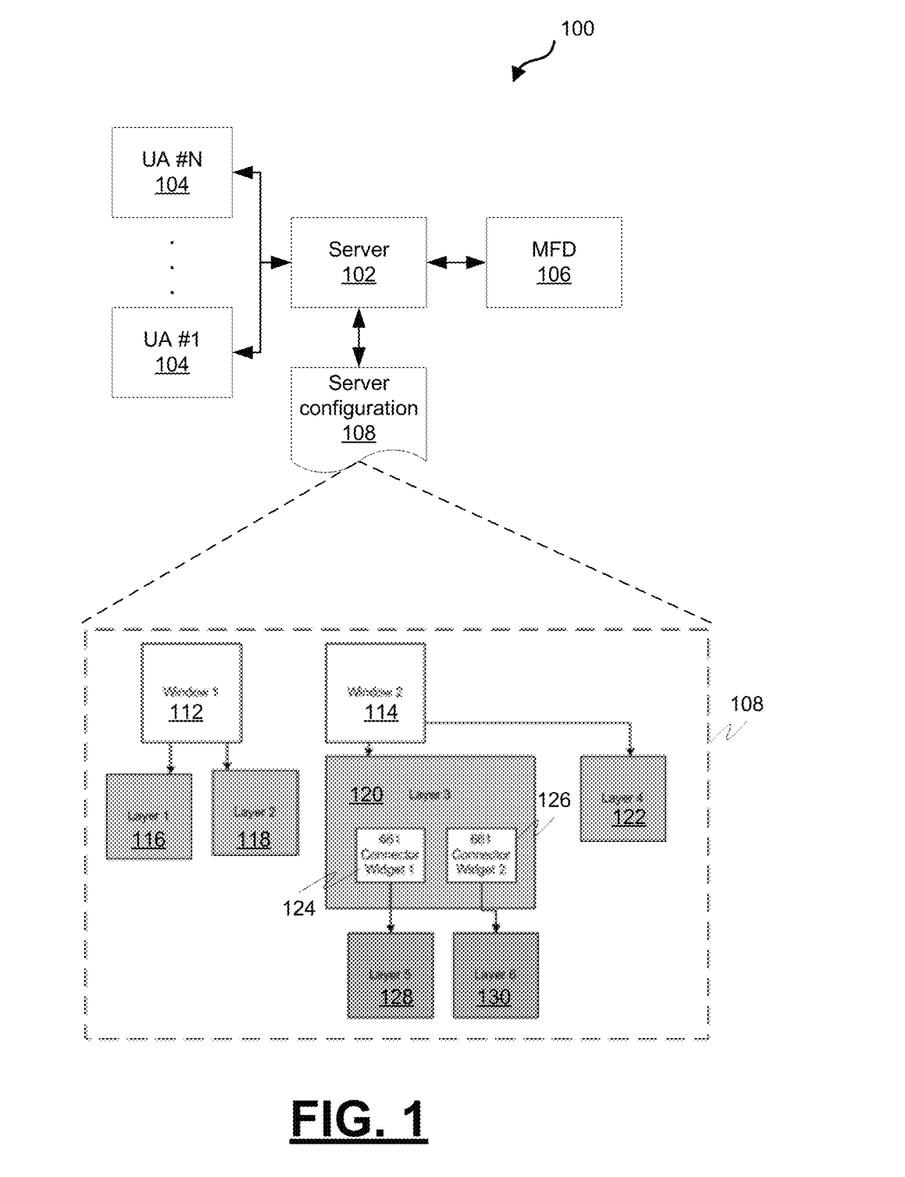
FIG. 1 is a block diagram depicting an example display system that includes an example CDS server, in accordance with some embodiments.

FIG. 1 is a block diagram depicting an example display system 100 that includes an example CDS server 102. The example CDS server 102 is configured to load graphical definition files (DF) for one or more UAs 104 and create a graphical hierarchical tree to represent the graphical user interface (GUI) displayed on a display device 106 for the flight crew. The DF is made of graphical building blocks (referred as widgets, e.g., as defined in the ARINC 661 specification) and each type of widget is associated with a specific graphical and interaction behavior, which the UA 104 can use to construct the GUI. The example CDS server 102 is further configured to receive commands from UAs 104 and update the widget states affected by the commands, generate graphical commands for all the widgets encompassed in a layer within a window displayed on the display device 106, process user interactions on the widgets, and send user interaction events to the UAs 104.

Widgets belonging to a single UA 104 are grouped and referenced by the CDS server 102 as a layer. Additionally, a single UA can be made up of multiple layers itself as well. For example, a PFD UA could be made up of an Airspeed Layer, and Altitude Layer, an Attitude layer and so on. Layers provide the mechanism to combine information from several UAs inside one graphical window on a display device 106. Additionally, a single layer can reference multiple layers from different UAs using a connector widget.

The example server configuration 108 provides an example organization of windows, layers and widgets to be displayed on a display device 106.

The example server configuration 108 includes two windows that may be displayed, window 1 (312) and a window 2 (314). The window 1 (312) includes two layers, a layer 1 (316) and a layer 2 (318). The window 2 (314) also includes two layers, a layer 3 (320) and a layer 4 (322). The layer 3 includes a connector widget 1 (324) that connects the layer to a connected layer, layer 5 (326). The layer 3 also includes a connector widget 2 (328) that connects the layer to another connected layer, layer 6 (330). Layer 1 (316), layer 2, (318) layer 3 (320) and layer 4 (322) are considered top-level layers. Layer 5 (326) and layer 6 (330) are considered connected layers. A layer is the higher-level entity encompassing widgets that belong to a single UA 104. Each layer may include one or more widgets.

The example CDS server 102 is configured to process, in parallel, top level and connected layers using multiple processors in an integrated circuit (IC) that includes a multi-core processor. Using an IC that includes a multi-core processor may result in a reduced overall processing time for the CDS server 102 and may allow for the use of lower power ICs to host the CDS server 102. To process the layers across different processor cores, the CDS server 102 is configured to parse the widgets/layers across all windows and create a layer tasks list which includes layer tasks that can be executed across the processor cores without interdependency or execution in a specific order.

The example CDS server 102 is configured to operate in two stages—a layer task creation stage (stage 1) and a layer task execution in multiple processor core stage (stage 2). In stage 1, the layer task creation stage, the example CDS server 102 is configured to (i) identify the top-level layers of the windows and recursively identify layers connected within layers (e.g., connected layers), (ii) extract graphical preconditions for the layers (e.g., top-level and connected layers), and (iii) create a list of layer tasks for the identified layers (e.g., top-level and connected layers).

The example CDS server 102 is configured to parse the server configuration 108 to identify the top-level layers and the connected layers. The layer is the higher-level entity encompassing widgets that belong to a single UA. Layers can reference other layers using "connector" widgets and multiple layers form a window. Layer visibility is controlled by the UA and is also based on the selected window configuration in the cockpit display. The example CDS server 102 is configured to parse the server configuration 108 to identify the windows displayed by the CDS and the top-level layers in the windows. The example CDS server 102 is further configured to parse the top-level layers to identify connector widgets that connect to connected layers. The connected layers may be further parsed to identify any additional connector widgets that connect to additional connected layers. The parsing of layers may be recursively carried out until all connected layers are identified. The example CDS server 102 is configured to carry out this identification step each frame.

The example CDS server 102 is configured to extract graphical preconditions for the layers (e.g., top-level and connected layers). The layers are displayed within a specific view area inside the window. For layers connected within layers, different combinations of rotation, translation, scaling and view area clipping settings and/or effects may be applied. By parsing the definition file of the individual layers, the example CDS server 102 can identify graphical preconditions required for the layer.

The example CDS server 102 is configured to create a layer task for each layer. A layer task includes the necessary information for a processor core to independently generate commands for execution by a graphical processing unit (GPU) to generate the graphics for a layer. Each layer task may be performed independently by a processor core, are not dependent on any specific processor core performing the layer task, and may be performed in parallel by multiple processor cores. Because layer tasks do not exhibit any dependency on a specific processor core, a layer task may be scheduled for execution to any available processor core. Table 1 provides an example layer task template:

TABLE 1

Example Layer Task Template

| Parameter | Description |
| --- | --- |
| Layer Identifier | Unique identifier for the layer designated. |
| Layer Task Type | Task can be of two types:<br>1. Top-Level Layer - a top level layer associated directly to the window.<br>2. Connected Layer - a layer referenced inside another layer with graphical settings. |
| Layer Task Sequence Number | Order of the layer for the final graphical image. |
| Window | Window in the Cockpit display system that owns the layer. |
| Per-Layer Pre-conditions | Graphical settings under which the layer needs to get displayed:<br>1. Position of the layer within the Window.<br>2. Rotational and Translation Settings of the Layer.<br>3. View Area (Scissor Box) for the layer. |

The example CDS server 102 is configured to create a list of layer tasks for the identified layers (e.g., top-level and connected layers). Table 2 provides an example listing of layer tasks for the server configuration 108:

TABLE 2

Example Layer Task List for Server Configuration 108

| Layer Task No (Sequence Number) | Window | Layer ID | Layer Task Type |
| --- | --- | --- | --- |
| 1 | 1 | 1 | Top-Level Layer |
| 2 | 1 | 2 | Top-Level Layer |
| 3 | 2 | 3 | Top-Level Layer |
| 4 | 2 | 5 | Connected Layer |
| 5 | 2 | 6 | Connected Layer |
| 6 | 2 | 4 | Top-Level Layer |

Shown in Table 2 for each layer task is a layer task number, an identifier for the window to which the layer task relates, a layer identifier, and an identifier of the layer task type.

In stage 2, the layer task execution in multiple processor core stage, the example CDS server 102 is configured to process the layer tasks using multiple processing cores. The example CDS server 102 is configured to process the layer tasks by: (i) scheduling the tasks to multiple processor cores, (ii) generating graphical commands for the layer tasks, and (iii) re-ordering of the graphical commands. Because layers may overlap other layers, the order of the graphical commands can be important.

Because layer tasks can be created without any specific affinity with a specific processor core and any layer task can be executed by any available processor core, the example CDS server 102 can assign layer tasks on a first come first serve (FCFS) basis. The example CDS server 102 is configured to assign the first task to the first available processor core and the scheduling repeats until the task list is empty.

The multiple processor cores used in the example CDS server 102 are configured to process the assigned layer tasks. The layer task processing involves the generation of graphical commands based on both the state of the widgets and the widget graphical definitions. Each processor core is configured to process the layer task for a layer to generate graphical commands for the layer and record the generated graphical commands in one or more layer-specific graphical command buffers. For connected layer tasks, pre-layer graphical settings are generated and stored in a layer-specific command buffer prior to the generation of graphical commands for the widgets associated with the connected layer.

Because layer tasks can be assigned to processor cores without regard to the visual ordering of the layer, the generated graphical commands may be generated out of order and may need to be placed into proper visual order before being executed by a GPU. Because layers may overlap other layers, the order of layer rendering can be important. Therefore, the graphical commands are re-ordered prior to execution by the GPU. The example CDS server 102 is configured to re-order the layer-specific graphical command buffers (which contain the graphical commands for a layer), for example, based on the layer task sequence number from layer task list so that the layer commands are ordered in a manner consistent with the order defined in the server configuration 108. The re-ordered command buffers can be submitted to the GPU for final rendering on a display device.

The example CDS server 102 is configured to perform the operations of stage 1 and stage 2 for every frame displayed on a display device. The task list continually varies and adapts to the configuration changes performed in the display. With parallel processing of the layers, the "wall time" of the server may reduce in proportion to the number of processor cores available for use in the IC.

Figure 2:
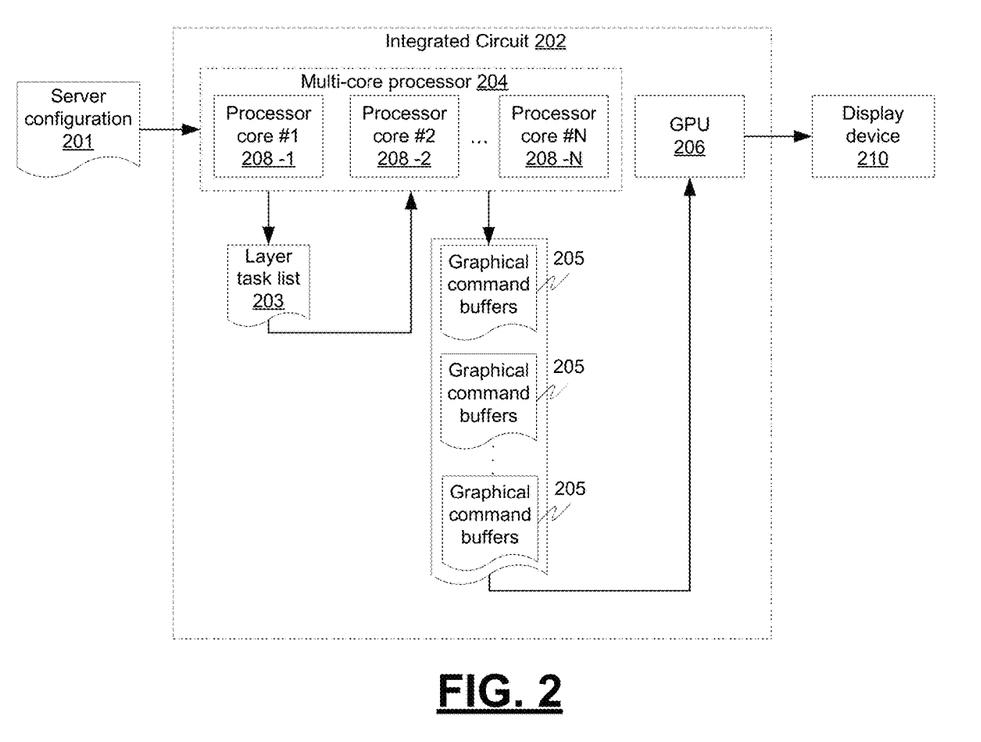
FIG. 2 is a block diagram depicting an example integrated circuit containing a multi-core processor and a GPU and configured to implement a graphic server, in accordance with some embodiments.

FIG. 2 is a block diagram depicting an example integrated circuit 202 containing a multi-core processor 204 and a GPU 206, wherein the example integrated circuit 202 is configured to implement a graphic server such as a modified ARINC 661 server. The example multi-core processor 204 includes two or more processor cores 208-1, 208-2, . . . , 208-N. The example graphic server is configured by programming instructions to use the multi-core processor 204 and the GPU 206 to render windows and associated layers on a display device 210.

The graphic server (e.g., server 102), at an initialization phase, is configured to build, using one of the processor cores, a Window-Layers-Widgets (i.e., Widget Tree) hierarchy structure by processing the server configuration 201 and individual definition files. For every frame, the server processes communication from the UAs (e.g., UAs 104), updates the widget states to the Widget Tree, transverses the Widget Tree to generate graphical commands, and submits the graphical commands in sequential order to the GPU for rendering all windows and their associated layers.

The graphic server, using one of the processor cores, parses the Widget Tree every frame to identify the top-level layers and all the connected layers inside the top-level layers. The graphic server, using one of the processor cores, is configured to create a task list 203 with a unique layer task for each layer in the Widget tree. To generate a unique layer task, the graphic server, using one of the processor cores, is configured to identify layers to be displayed; extract graphical preconditions for each layer; and create a layer task for each layer, wherein each layer task includes the necessary information to generate the graphics described by the layer.

The graphic server, using one of the processor cores, is configured to assign layer tasks in the layer task list 203 on a FCFS basis to the processor cores (208-1, 208-2, . . . , 208-N) for processing. Each processor core is configured to generate commands in response to its assigned layer task and configured to store the generated commands in one or more layer-specific graphical command buffers 205. With parallel processing of the layers, the "wall time" of the server may reduce in proportion to the number of processor cores available for use in the IC.

The server, using one of the processor cores, is configured to re-order the graphical command buffers 205 after all layer-specific graphical command buffers 205 have been generated. The server, using the GPU 206, is configured to execute the commands in the graphical command buffers 205 to render the windows, layers, and widgets on the display device 210.

Figure 3:
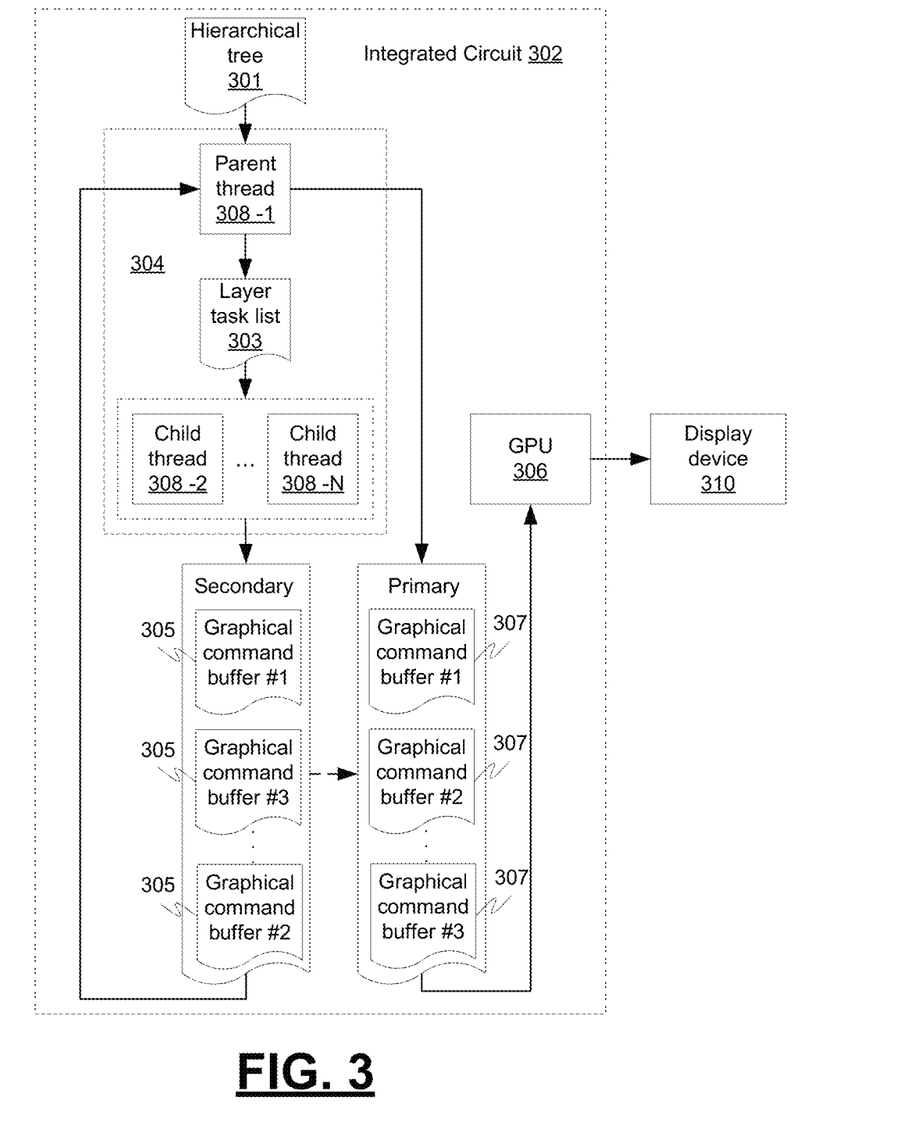
FIG. 3 is a block diagram depicting another example integrated circuit containing a multi-core processor and a GPU and configured to implement a graphic server, in accordance with some embodiments.

FIG. 3 is a block diagram depicting an example integrated circuit 302 containing a multi-core processor 304 and a GPU 306, wherein the example integrated circuit 302 is configured to implement a graphic server such as a modified ARINC 661 server. The multi-core processor 304 is capable of multiple thread execution using the multi-core processor. In this example, the multi-core processor 304 includes a parent thread 308-1 and two or more child threads 308-2 to 308-N. The example graphic server is configured by programming instructions to use the multi-core processor 304 and the GPU 306 to render windows and associated layers on a display device 310.

The graphic server (e.g., server 102), at an initialization phase, is configured to build, using the main application thread (also referred as parent thread), a Window-Layers-Widgets (i.e., Widget Tree) hierarchy structure 301 by processing the server configuration (e.g., server configuration 108) and individual definition files. For every frame, the server processes communication from the UAs (e.g., UAs 104), updates the widget states to the Widget Tree 301 and performs sequential rendering of all windows and its associated layers.

The graphic server, using the parent thread 308-1, is configured to parse the Widget Tree 301 every frame to identify the top-level layers and all the connected layers inside the top-level layers. The parent thread 308-1 is also used to processing the Widget Tree 301 to create a layer task list 303 with a unique layer task for each layer in the Widget tree 301. To generate a unique layer task, the parent thread 308-1 is configured to identify layers to be displayed by a display device 310; extract graphical preconditions for each layer; and create a layer task list 303 that includes a layer task for each layer, wherein each layer task includes the necessary information to generate the graphics described by the layer. The layer task list 303 may be implemented using an array data structure. The necessary information to generate the graphics described by the layer may include a layer identifier, a layer task type, a layer task sequence number, an identifier for the window in the cockpit display system that owns the layer, and graphical settings under which the layer needs to get displayed. The necessary information to generate drawing commands also includes the portion of the widget tree associated with the layer. For example, the necessary information may include the knowledge of which buttons, dials, checkboxes, labels, etc. need to be drawn to make up the visual display element of the user interface along with their states such as button text, dial position, checked/unchecked state, which may be runtime-configurable.

The parent thread 308-1 is configured to identify top-level layers and connected layers when identifying layers to be displayed by a display device. The parent thread 308-1 is configured to parse the definition file for the layer and determine whether parameter values other than default parameter values specified in the definition file are being used for the layer to extract graphical preconditions for each layer.

Based on the number of processor cores (e.g., processor cores 208-1, 208-2, . . . , 208-N) configured for server operations, respective number of task list processing threads (308-2 to 308-N) (also referred as child threads) can be created and bonded to the specific processor cores or thread assignment could be performed by an operating system scheduler. Binding of child threads (308-2 to 308-N) to processor cores may be performed by using a processor/thread affinity function provided by an operating system. At the initialization phase of the server, child threads (308-2 to 308-N) are configured to be in a suspended state.

After completion of the layer task list generation, the parent thread is configured to suspend operations and the child threads (308-2 to 308-N) affined to individual processor cores are configured to resume operation. Layer tasks are assigned to the child threads (308-2 to 308-N) based on a FCFS basis in this example. Other example task-to-core assignment strategies, however, may also be employed. For example, an assignment strategy that assigns layers with the highest safety criticality first may be employed. Also, an assignment strategy that considers the observed layer preparation times from the previous frame, and uses a packing heuristic to assign layers to cores in such a way as to even the load may be employed.

The child threads (308-2 to 308-N) are assigned with secondary command buffers 305 and are configured to record graphical commands for the layer generated through performing the assigned layer task in the assigned secondary command buffer 305. Upon completing the task list 303, the child threads (308-2 to 308-N) are configured to notify the parent thread 308-1 and suspend operation.

The parent thread 308-1 is configured to resume operation after suspension of all the child threads (308-2 to 308-N) (i.e., after completion of the entire task list 303). The parent thread 308-1 is configured to, e.g., based on the layer task sequence number, assemble the secondary command buffers 305 processed by the child threads (308-2 to 308-N) to form primary command buffers 307 (e.g., re-order the graphical commands in proper visual order by re-ordering the layer-specific graphical command buffers). In an example implementation, the Vulkan graphics API can be used to generate command buffers (e.g., secondary buffers) that can be executed in an order different from the order in which the command buffers were generated (e.g., via primary buffers). With parallel processing of the layers, the "wall time" of the server may reduce in proportion to the number of child threads (308-2 to 308-N) that can be assigned to independent processing cores available for use in the IC. The GPU 306 is configured to process the primary command buffers 307 to render the windows, layers, and widgets on the display device 310.

In this example, thread coordination is described as including one parent thread and multiple child worker threads. It is also possible to have one of the "child" threads take on the "parent" role between frames. For example, the child thread that is first to find itself with no work remaining could take on the parent role (and resume a child role after the task list is created).

Figure 4:
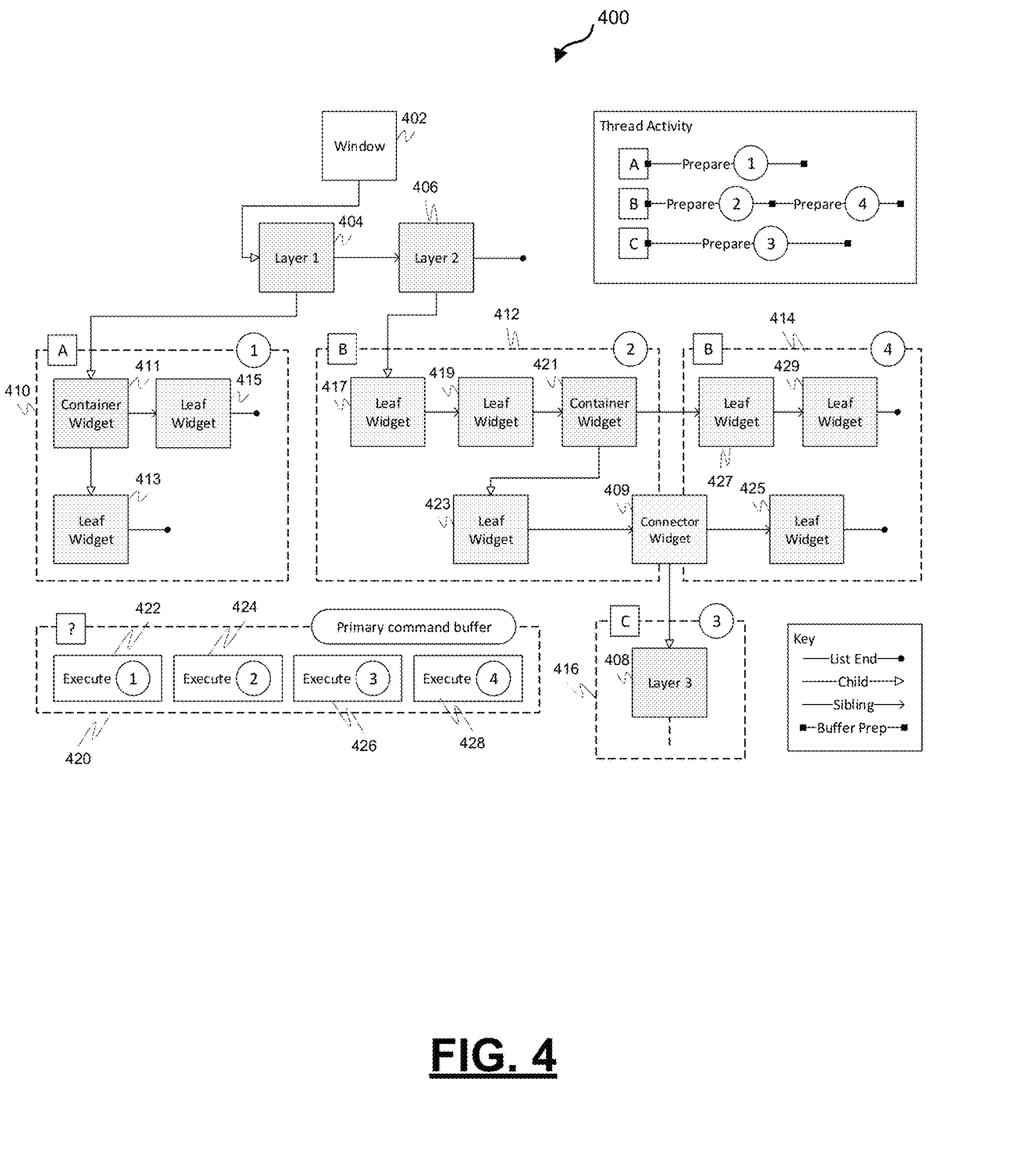
FIG. 4 is a block diagram depicting an example widget tree that is processed by an example graphic server, in accordance with some embodiments.

FIG. 4 is a block diagram depicting an example widget tree 400 that is processed by an example graphic server (not shown). As depicted in the example widget tree 400, a window 402 contains a list of layers (Layer 1 (404), Layer 2 (406) and Layer 3 (408)), a layer contains a list of widgets, container widgets contain lists of child widgets, and connector widgets have a reference to a single layer. The example graphic server is configured to draw the layers and widgets. Layers and widgets are drawn in list order, but when container widgets are drawn, the container itself is drawn and then all its children are drawn recursively before drawing the sibling widget after the container. Similarly, connector widgets are drawn by drawing the layer that they reference before drawing the sibling widget after the connector widget. To accomplish this method of drawing, the example graphic server may execute a "pre-order tree traversal" algorithm.

In a single threaded graphic server system, drawing commands would be prepared in the same order as the desired drawing order. With the example graphic server, which is a multiprocessor system, drawing commands are prepared in separate threads, possibly out of order, and are re-ordered before the example graphic server executes the drawing commands.

In one example, the Vulkan graphics API is used by the example graphic server. The Vulkan graphics API allows graphics commands to be recorded into 'command buffers' that can later be executed in a different order than the order in which they were prepared. Vulkan is also configured to allow command buffers to be executed by a different thread than the recording thread. Vulkan provides two types of command buffers, primary and secondary. Primary command buffers can record commands that execute secondary command buffers (and thereby, the commands recorded in the secondary buffers). The secondary command buffers can be recorded in one order, and executed (via the primary command buffer) in a different order.

The example graphic server advantageously uses the Vulkan command buffers by recording one or more secondary command buffers per layer using threads that execute in parallel on different CPU cores. Once all the secondary command buffers for all the layers in a window have been recorded, they are submitted to the GPU, in the example graphic server, for execution in the correct visual order using a primary command buffer.

As illustrated in FIG. 4, when the example graphic server renders a layer, if the layer contains a connector widget (e.g., connector widget 409), the rendering for that layer is split into multiple command buffers. If a layer contains n connectors, the layer will, in general, be split into n+1 command buffers. This allows the example graphic server to insert the separately-prepared command buffer(s) of the connected layer(s) in their proper order within the containing layer.

As illustrated in FIG. 4, the example graphic server includes three threads, threads A, B, and C (assumed to be executing on separate CPU cores), that are, respectively, assigned to prepare drawing commands for Layer 1 (404), Layer 2 (406), and Layer 3 (408). Each thread has its own independent graphics context. The drawing commands are recorded in secondary command buffers 410, 412, 414, 416. A primary command buffer 420 records commands 422, 424, 426, 428 to execute each of the secondary command buffers 410, 412, 414, 416 in tree-traversal-order.

Layer 1 (404) neither contains nor is contained by a connector widget. In this case, Thread A draws (or, more precisely, prepares drawing commands for) each top-most widget (e.g., container widget 411, leaf widget 413, and leaf widget 415). Thread A is configured to draw the container widget 411 first (because it is the first encountered widget), then the child of the container widget (leaf widget 413), and then the sibling widget (leaf widget 415). The drawing commands prepared by Thread A are contained in the secondary command buffer 410.

Layer 2 contains a connector widget 409 (inside a container widget 417) which references Layer 3. Thread B is configured to draw, in order, Leaf widgets 417, 419, 421, and 423 in secondary command buffer 412.

Thread B is configured to not draw Layer 3 recursively in order with the rest of the Layer 2 widgets to allow Layer 3 to be drawn by a different thread. Instead of drawing the connected layer, secondary command buffer 412 is ended and Thread B begins drawing in a new command buffer, secondary command buffer 414. Thread B is configured to draw, in order, Leaf widgets 425, 427, and 429 in secondary command buffer 414. This creates a break in the Layer 2 rendering commands wherein the separately-prepared Layer 3 rendering commands may be inserted in their proper sequential order. Thus, Thread B prepares two command buffers, secondary command buffer 412 and secondary command buffer 414, for Layer 2. The work done by Thread B could be considered a single "layer task" that prepares two buffers.

Thread C is configured to draw Layer 3. Because Layer 3 is not a top-level layer, it requires special handling. If it were rendered inline (in tree order) by Thread B, command preparation for the connected layer would inherit the appropriate graphical state (such as translation, rotation, or masking) applied by container widgets, since this state is updated incrementally while drawing. However, since Layer 3 is drawn by Thread C, and has a separate graphics context, it does not inherit the graphics state automatically. Furthermore, Thread C cannot obtain a copy of the state from Thread B unless Thread C waits for Thread B command preparation to reach the Connector Widget 409, which would prevent the desired thread parallelism.

Therefore, Thread C is configured to independently determine all applicable graphics state as if it were inherited. In this example, this includes the position of Layer 2 (406) within the window 402, the position of the Container Widget 421 within Layer 2 (406), and any scale, translation, rotation, or masking that the Container Widget 421 applies to its children. In general, all containers and connectors between the referenced layer and the top most window should be accounted for.

Translation, rotation, and scaling applied by intermediate containers are determined conceptually by traversing the tree 400 upward until a topmost layer (e.g., Layer 2) is reached, and examining the ARINC 661 widget attributes (such as CenterX, CenterY, and RotationAngle, for a RotationContainer) for each container encountered along the way, as well as the topmost layer position. Translation, rotation, and scaling are then combined to form the graphical preconditions to be put in effect when the assigned thread starts preparing commands to draw the contained layer. Thread C is configured to determine all applicable graphics state and draw Layer 3 in secondary command buffer 416.

After all of the secondary command buffers are prepared, a thread can prepare a primary command buffer 420, which can record commands (422, 424, 426, and 428) that execute secondary command buffers 410, 412, 416, and 414 (and thereby, the commands recorded in the secondary buffers). The secondary command buffers 410, 412, 414, and 416 can be recorded in one order, and executed (via the primary command buffer 420) in a different order.

Figure 5:
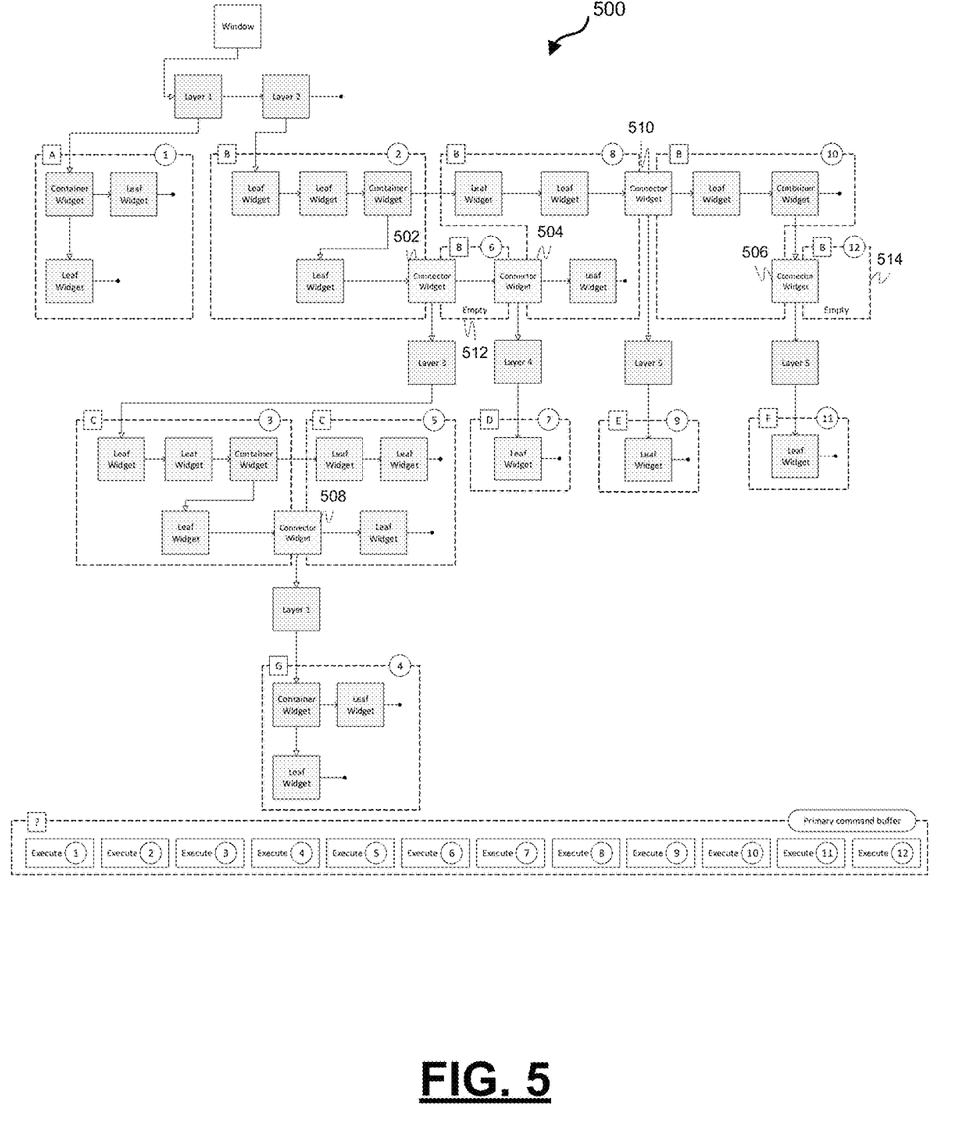
FIG. 5 is a block diagram depicting an example widget tree that is processed by an example graphic server, in accordance with some embodiments.

FIG. 5 is a block diagram depicting an example widget tree 500 that is processed by an example graphic server (not shown). The example widget tree 500 provides examples of layer splitting due to connectors (e.g., connectors 502, 504, 506, 508, 510). In some cases, the splitting produces command buffers that do not need to draw anything (e.g., command buffers 512, 514). Slightly more sophisticated algorithms could detect these cases and avoid including these empty secondary buffers in the primary buffer, and also could avoid recording the empty secondary buffers at all.

Command buffers are shown numbered in their eventual execution order, but they are not likely to be created or prepared in that order. In practice, each command buffer may be assigned an opaque handle, and their execution order may be determined by a (non-drawing) depth-first tree traversal, after the drawing is completed. The thread labels illustrate the command buffers that are prepared together by a single thread but do not necessarily indicate the number of threads available in the example graphic server.

Figure 6:
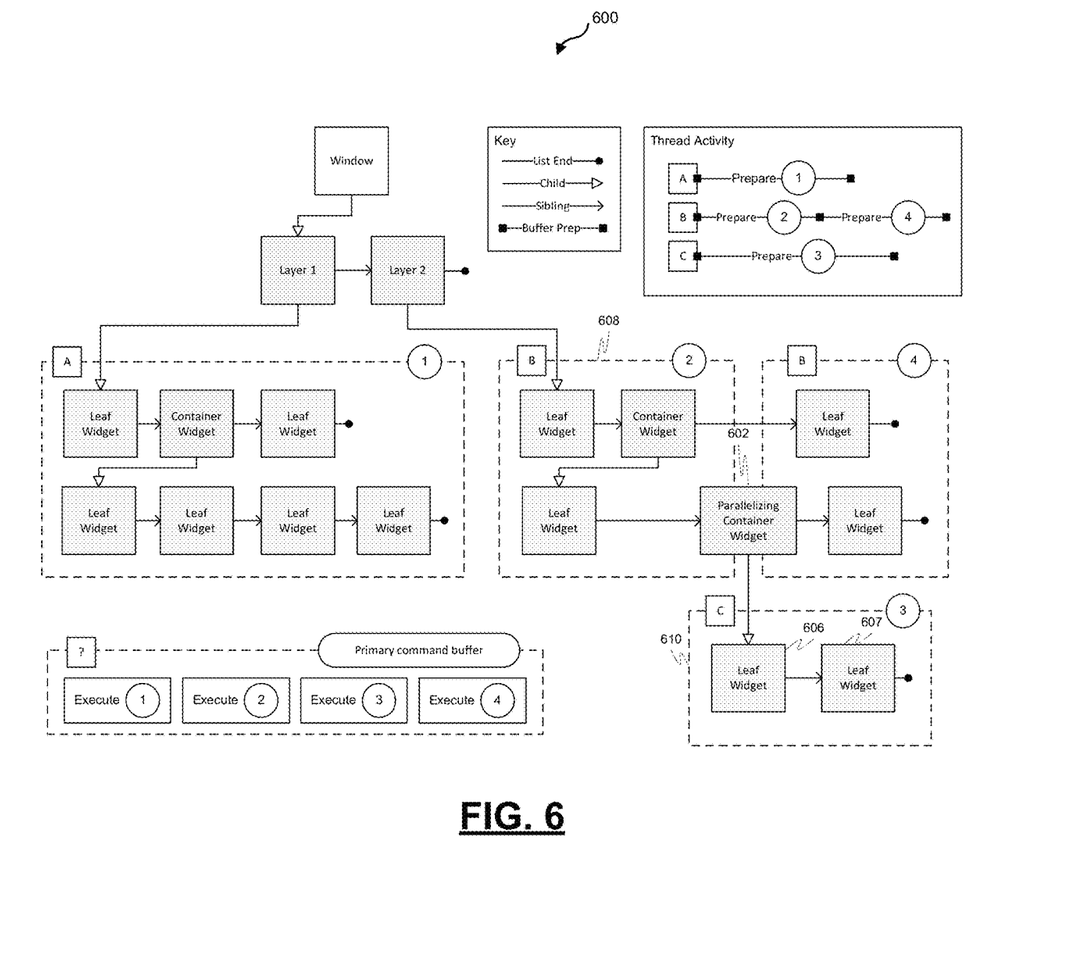
FIG. 6 is a block diagram depicting another example widget tree that is processed by an example graphic server, in accordance with some embodiments.

FIG. 6 is a block diagram depicting an example widget tree 600 that is processed by an example graphic server (not shown). The example widget tree 600 provides an example of layer splitting due to a parallelizing container widget 602. If a single layer (e.g., layer 2) has a disproportionately large processing time, it may be desirable to divide the layer across multiple processing cores without changing the layer semantics from the point of the of the user application. In this case, a parallelizing container widget 602 could be employed. This parallelizing container widget 602 would have no visual effect, but children (e.g., leaf widget 606) placed in the parallelizing container widget 602 would be processed in a thread separate from the host layer (e.g., leaf widget 606 may be processed in thread C (610) which is separate from host layer thread B (608). The preconditions for drawing the children of the parallelizing container widget 602 can be established in the same way that preconditions are established for children of a layer referenced by a connector widget.

In the example of FIG. 6, two layers (Layer 1 and Layer 2) with identical display widgets are shown. In this example, Layer 2 has grouped two child widgets 606 and 607 into container 602 so that Layer 2 child widgets can be prepared in parallel by two threads: one thread preparing widgets 606 and 607, and the other thread preparing the other widgets in Layer 2.

Figure 7:
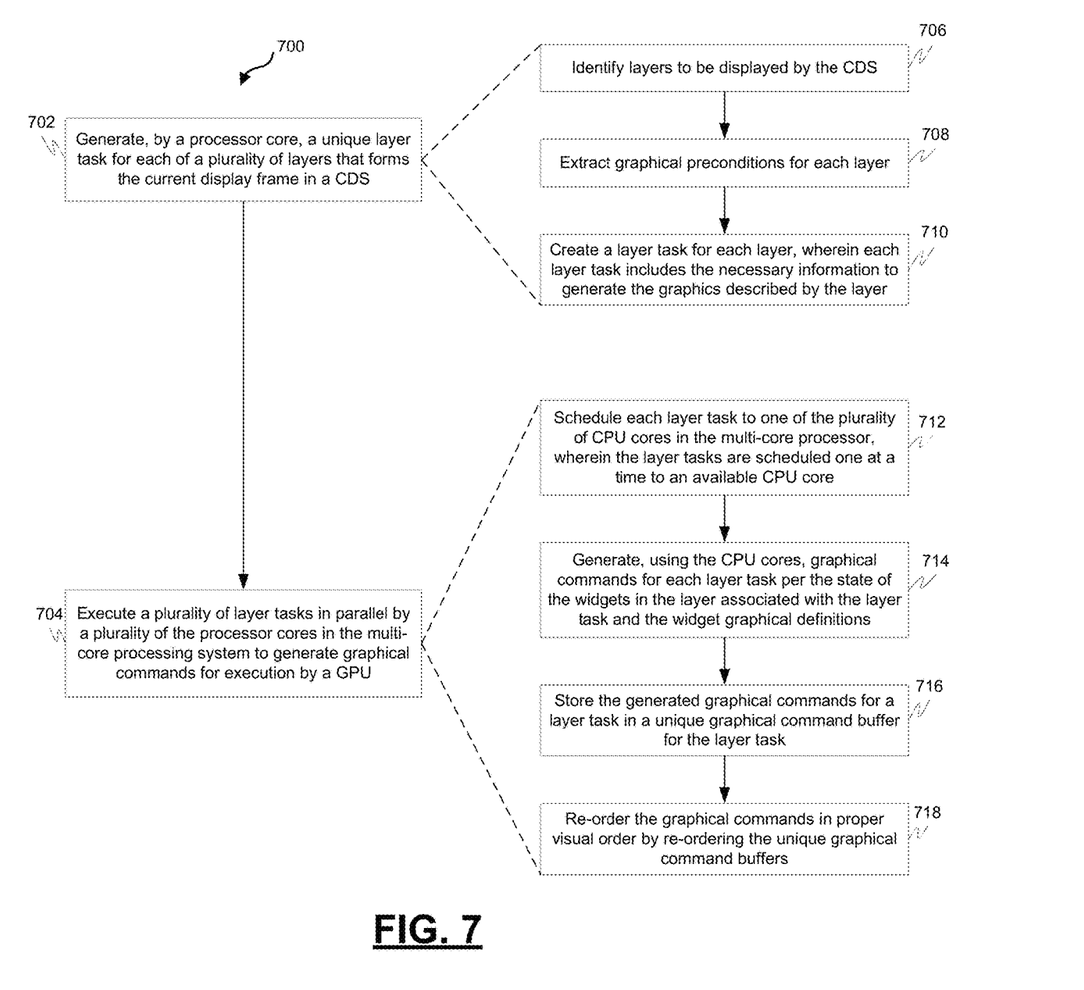
FIG. 7 is a process flow chart depicting an example process in an integrated circuit for generating graphical commands for displaying windows, layers, and widgets on a display device, in accordance with some embodiments.

FIG. 7 is a process flow chart depicting an example process 700 in an integrated circuit for generating graphical commands for displaying windows, layers, and widgets on a display device. The example process 700 includes generating, by a processor core, a unique layer task for each of a plurality of layers that forms the current display frame in a CDS (operation 702) and executing a plurality of layer tasks in parallel by a plurality of the processor cores in the multi-core processing system to generate graphical commands for execution by a GPU (operation 704).

Generating, by a processor core, a unique layer task for each of a plurality of layers that forms the current display frame in a CDS (operation 702) may be performed in the context of a CDS that is configured to display a plurality of windows, wherein each window comprises a plurality of layers, each layer is configured to be displayed within a specific viewing area within a window, each layer comprises one or more widgets that belong to a single user application, and wherein each layer task includes the necessary information for a processor core in the multi-core processing system to generate graphical commands that when executed by a graphical processing unit (GPU) causes the rendering of the graphics described by the layer.

Generating, by a processor core, a unique layer task for each of a plurality of layers that forms the current display frame in a CDS (operation 702) may include identifying layers to be displayed by the CDS (operation 706) wherein identifying layers to be displayed by a CDS comprises identifying top-level layers and connected layers.

Generating, by a processor core, a unique layer task for each of a plurality of layers that forms the current display frame in a CDS (operation 702) may also include extracting graphical preconditions for each layer (operation 708). Extracting graphical preconditions for each layer may include parsing the definition file for the layer and determining whether parameter values other than default parameter values specified in the definition file are being used for the layer.

Generating, by a processor core, a unique layer task for each of a plurality of layers that forms the current display frame in a CDS (operation 702) may further include creating a layer task for each layer, wherein each layer task includes the necessary information to generate the graphics described by the layer (operation 710). The necessary information to generate the graphics described by the layer may include a layer identifier, a layer task type, a layer task sequence number, an identifier for the window in the cockpit display system that owns the layer, and graphical settings under which the layer needs to get displayed.

Executing a plurality of layer tasks in parallel by a plurality of the processor cores in the multi-core processing system to generate graphical commands for execution by a GPU (operation 704) to render another display frame in the CDS may include scheduling each layer task to one of the plurality of processor cores in the multi-core processor, wherein the layer tasks are scheduled one at a time to an available processor core (operation 712). Executing a plurality of layer tasks in parallel by a plurality of the processor cores in the multi-core processing system to generate graphical commands for execution by a GPU (operation 704) to render another display frame in the CDS may also include generating, using the processor cores, graphical commands for each layer task per the state of the widgets in the layer associated with the layer task and the widget graphical definitions (operation 714). Executing a plurality of the sets of layer tasks in parallel may further include storing the generated graphical commands for a layer task in one or more unique graphical command buffers for the layer task (operation 716). Executing a plurality of the sets of layer tasks in parallel may additionally include re-ordering the graphical commands in proper visual order by re-ordering the unique graphical command buffers (operation 718).

The example process 700 may further include submitting the re-ordered graphical commands to a GPU for rendering.

Described herein are techniques for generating graphical commands in a cockpit display system using a multi-core processor. Using an IC that includes a multi-core processor may result in a reduced overall processing time for a graphics server and may allow for the use of lower power ICs to host the graphics server.

In one embodiment, a method in a multi-core processing system for generating graphical commands is provided. The method comprises generating, by a processor core, a unique layer task for each of a plurality of layers that forms the current display frame in a cockpit display system (CDS), wherein the CDS is configured to display a plurality of windows, each window comprises a plurality of layers, each layer is configured to be displayed within a specific viewing area within a window, each layer comprises one or more widgets that belong to a single user application, and wherein each layer task includes information for a processor core in the multi-core processing system to use to generate graphical commands that when executed by a graphical processing unit (GPU) cause the rendering of the graphics described by the layer. The method further comprises executing a plurality of layer tasks in parallel by a plurality of the processor cores in the multi-core processing system to generate graphical commands for execution by the GPU to render another display frame in the CDS.

These aspects and other embodiments may include one or more of the following features. Generating the unique layer task for each of the plurality of layers may comprise identifying layers to be displayed by the CDS; extracting graphical preconditions for each layer; and creating a layer task for each layer, wherein each layer task includes the necessary information to generate the graphics described by the layer. The necessary information to generate the graphics described by the layer may comprise a layer identifier, a layer task type, a layer task sequence number, an identifier for the window in the cockpit display system that owns the layer, and graphical settings under which the layer needs to get displayed. Extracting graphical preconditions for each layer may comprise parsing the definition file for the layer and determining whether parameter values other than default parameter values specified in the definition file are being used for the layer. Determining the graphical preconditions may include determining the layer offset for top level layers or determining the sequence of transformations from container widgets enclosing the connector widget for connected layers. Identifying layers to be displayed by a cockpit display system may comprise identifying top-level layers and connected layers. Executing a plurality of the sets of layer tasks in parallel may comprise scheduling each layer task to one of the plurality of processor cores in the multi-core processor, wherein the layer tasks are scheduled one at a time to an available processor core. Executing a plurality of the sets of layer tasks in parallel may further comprise generating, using the processor cores, graphical commands for each layer task per the state of the widgets in the layer associated with the layer task and the widget graphical definitions. Executing a plurality of the sets of layer tasks in parallel may further comprise storing the generated graphical commands for a layer task in one or more unique graphical command buffers for the layer task. The method may further comprise re-ordering the graphical commands in proper visual order by re-ordering the unique graphical command buffers. The method may further comprise submitting the re-ordered graphical commands to a GPU for rendering on the CDS.

In another embodiment, a multi-core processing system in an integrated circuit configured by programming instructions in non-transient computer readable media is provided. The multi-core processing system is configured to generate, by a processor core, a unique set of layer tasks for each of a plurality of layers that forms the current display frame in a cockpit display system (CDS), wherein the CDS is configured to display a plurality of windows, each window comprises a plurality of layers, each layer is configured to be displayed within a specific viewing area within a window, each layer comprises one or more widgets that belong to a single user application, and wherein the layer tasks for a layer comprise tasks for the processor cores in the multi-core processing system to perform to generate graphical commands that when executed by a graphical processing unit (GPU) cause the rendering of the widgets in the layer. The multi-core processing system is further configured to execute a plurality of the sets of layer tasks in parallel by a plurality of processor cores to generate graphical commands for execution by the GPU to render another display frame in the CDS.

These aspects and other embodiments may include one or more of the following features. To generate a unique set of layer tasks, the processor core may be configured to: identify layers to be displayed by a cockpit display system; extract graphical preconditions for each layer; and create a layer task for each layer, wherein each layer task includes the necessary information to generate the graphics described by the layer. The necessary information to generate the graphics described by the layer may comprise a layer identifier, a layer task type, a layer task sequence number, an identifier for the window in the cockpit display system that owns the layer, and graphical settings under which the layer needs to get displayed. To extract graphical preconditions for each layer, the processor core may be configured to parse the definition file for the layer and determine whether parameter values other than default parameter values specified in the definition file are being used for the layer. The processor core may be configured to identify top-level layers and connected layers when identifying layers to be displayed by a cockpit display system. To execute a plurality of the sets of layer tasks in parallel, the system may be configured to schedule each layer task to one of the plurality of processor cores in the multi-core processor, wherein the layer tasks are scheduled one at a time to an available processor core. To execute a plurality of the sets of layer tasks in parallel the system may be further configured to generate, using the processor cores, graphical commands for each layer task per the state of the widgets in the layer associated with the layer task and the widget graphical definitions. To execute a plurality of the sets of layer tasks in parallel, the system may be further configured to store the generated graphical commands for a layer task in one or more unique graphical command buffers for the layer task. The system may be further configured to re-order the graphical commands in proper visual order by re-ordering the unique graphical command buffers. The multi-core processing system may further comprise a GPU configured to execute the re-ordered graphical commands for rendering on the CDS.

In another embodiment, a processor-implemented method in an aircraft for distributing the processing of graphical components to parallel processor cores in a multi-core processor is provided. The method comprises: identifying layers to be displayed by a cockpit display system, wherein the cockpit display system is configured to display a plurality of windows, each window comprises a plurality of layers, each layer is configured to be displayed within a specific viewing area within a window, and each layer comprises one or more widgets that belong to a single user application. The method further includes extracting graphical preconditions for each layer by parsing the definition file for the layer and determining whether parameter values other than default parameter values specified in the definition file are being used for the layer; creating a layer task for each layer, wherein each layer task includes the necessary information to generate the graphics described by the layer, and the necessary information for each layer task includes a layer identifier, a layer task type, a layer task sequence number, an identifier for the window in the cockpit display system that owns the layer, and graphical settings under which the layer needs to get displayed. The method further includes scheduling each layer task to one of the plurality of processor cores in the multi-core processor, wherein the layer tasks are scheduled one at a time to an available processor core; generating, using the processor cores, graphical commands for each layer task per the state of the widgets in the layer associated with the layer task and the widget graphical definitions; storing the generated graphical commands for a layer task in one or more unique graphical command buffers for the layer task; re-ordering the graphical commands in proper visual order by re-ordering the unique graphical command buffers; and submitting the re-ordered graphical commands to a graphics processor for rendering on the cockpit display system.

In another embodiment, a multi-core processing system is provided. The multi-core processing system is configured to: identify a plurality of graphical window segments in a graphical window; generate, by a processor core, a unique set of segment tasks for each of the plurality of graphical window segments that forms a current display frame for the graphical window, wherein the segment tasks for a graphical window segment comprise tasks for the processor cores in the multi-core processing system to perform to generate graphical commands that when executed by a graphical processing unit (GPU) cause the rendering of the graphical elements in the graphical window segment; and execute a plurality of the sets of segment tasks in parallel by a plurality of processor cores to generate graphical commands for execution by the GPU to render another display frame.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method in a multi-core processing system for generating graphical commands, the method comprising:
   generating, by a processor core, a unique layer task for each of a plurality of layers that forms the current display frame in a cockpit display system (CDS), wherein the CDS is configured to display a plurality of windows, each window comprising a plurality of layers, each layer configured to be displayed within a specific viewing area within a window, each layer comprising one or more widgets that belong to a single user application, and wherein each layer task includes information for a processor core in the multi-core processing system to use to generate graphical commands that when executed by a graphical processing unit (GPU) cause the rendering of the graphics described by the layer, wherein the generating the unique layer task for each of the plurality of layers comprises:
   identifying layers to be displayed by the CDS;
   extracting graphical preconditions for each layer; and
   creating a layer task for each layer, wherein each layer task includes the necessary information to generate the graphics described by the layer, wherein the necessary information to generate the graphics described by the layer comprises a layer identifier, a layer task type, a layer task sequence number, an identifier for the window in the cockpit display system that owns the layer, and graphical settings under which the layer needs to get displayed; and
   executing a plurality of layer tasks in parallel by a plurality of the processor cores in the multi-core processing system to generate graphical commands for execution by the GPU to render another display frame in the CDS.

2. The method of claim 1, wherein the extracting graphical preconditions for each layer comprises parsing a definition file for the layer and determining whether parameter values other than default parameter values specified in the definition file are being used for the layer.

3. The method of claim 1, wherein identifying layers to be displayed by a cockpit display system comprises identifying top-level layers and connected layers.

4. The method of claim 1, wherein executing a plurality of the sets of layer tasks in parallel comprises scheduling each layer task to one of the plurality of processor cores in the multi-core processor, wherein the layer tasks are scheduled one at a time to an available processor core.

5. The method of claim 4, wherein executing a plurality of the sets of layer tasks in parallel further comprises generating, using the processor cores, graphical commands for each layer task per the state of the widgets in the layer associated with the layer task and the widget graphical definitions.

6. The method of claim 5, wherein executing a plurality of the sets of layer tasks in parallel further comprises storing the generated graphical commands for a layer task in one or more unique graphical command buffers for the layer task.

7. The method of claim 6, further comprising re-ordering the graphical commands in proper visual order by re-ordering the unique graphical command buffers.

8. A multi-core processing system in an integrated circuit configured by programming instructions in non-transient computer readable media, the multi-core processing system configured to:
   generate, by a processor core, a unique set of layer tasks for each of a plurality of layers that forms the current display frame in a cockpit display system (CDS), wherein the CDS is configured to display a plurality of windows, each window comprising a plurality of layers, each layer configured to be displayed within a specific viewing area within a window, each layer comprising one or more widgets that belong to a single user application, and wherein the layer tasks for a layer comprise tasks for the processor cores in the multi-core processing system to perform to generate graphical commands that when executed by a graphical processing unit (GPU) cause the rendering of the widgets in the layer, wherein to generate a unique set of layer tasks, the processor core is configured to:

identify layers to be displayed by a cockpit display system;

extract graphical preconditions for each layer; and create a layer task for each layer, wherein each layer task includes the necessary information to generate the graphics described by the layer, wherein the necessary information to generate the graphics described by the layer comprises a layer identifier, a layer task type, a layer task sequence number, an identifier for the window in the cockpit display system that owns the layer, and graphical settings under which the layer needs to get displayed; and execute a plurality of the sets of layer tasks in parallel by a plurality of processor cores to generate graphical commands for execution by the GPU to render another display frame in the CDS.

9. The multi-core processing system of claim 8, wherein to extract the graphical preconditions for each layer, the processor core is configured to parse a definition file for the layer and determine whether parameter values other than default parameter values specified in the definition file are being used for the layer.

10. The multi-core processing system of claim 8, wherein the processor core is configured to identify top-level layers and connected layers when identifying layers to be displayed by a cockpit display system.

11. The multi-core processing system of claim 8, wherein to execute a plurality of the sets of layer tasks in parallel, the system is configured to schedule each layer task to one of the plurality of processor cores in the multi-core processor, wherein the layer tasks are scheduled one at a time to an available processor core.

12. The multi-core processing system of claim 11, wherein to execute a plurality of the sets of layer tasks in parallel the system is further configured to generate, using the processor cores, graphical commands for each layer task per the state of the widgets in the layer associated with the layer task and the widget graphical definitions.

13. The multi-core processing system of claim 12, wherein to execute a plurality of the sets of layer tasks in parallel, the system is further configured to store the generated graphical commands for a layer task in one or more unique graphical command buffers for the layer task.

14. The multi-core processing system of claim 13, wherein the system is further configured to re-order the graphical commands in proper visual order by re-ordering the unique graphical command buffers.

15. The multi-core processing system of claim 14, further comprising a GPU configured to execute the re-ordered graphical commands for rendering on the CDS.

16. A processor-implemented method in an aircraft for distributing the processing of graphical components to parallel processor cores in a multi-core processor, the method comprising:

identifying layers to be displayed by a cockpit display system, wherein the cockpit display system is configured to display a plurality of windows, each window comprises a plurality of layers, each layer is configured to be displayed within a specific viewing area within a window, and each layer comprises one or more widgets that belong to a single user application;

extracting graphical preconditions for each layer;

creating a layer task for each layer, wherein each layer task includes the necessary information to generate the graphics described by the layer, and the necessary information for each layer task includes a layer identifier, a layer task type, a layer task sequence number, an identifier for the window in the cockpit display system that owns the layer, and graphical settings under which the layer needs to get displayed;

scheduling each layer task to one of the plurality of processor cores in the multi-core processor, wherein the layer tasks are scheduled one at a time to an available processor core; and generating, using the processor cores, graphical commands for each layer task per the state of the widgets in the layer associated with the layer task and the widget graphical definitions.

17. The method of claim 16, further comprising storing the generated graphical commands for a layer task in one or more unique graphical command buffers for the layer task.

18. The method of claim 17, further comprising re-ordering the graphical commands in proper visual order by re-ordering the unique graphical command buffers.

19. The method of claim 18, further comprising submitting the re-ordered graphical commands to a graphics processor for rendering on the cockpit display system.

20. The method of claim 16, wherein the extracting graphical preconditions for each layer comprises extracting the graphical preconditions for each layer by parsing a definition file for the layer and determining whether parameter values other than default parameter values specified in the definition file are being used for the layer.

* * * * *